US010637030B2

(12) United States Patent
Hara et al.

(10) Patent No.: US 10,637,030 B2
(45) Date of Patent: Apr. 28, 2020

(54) NONAQUEOUS ELECTROLYTE SECONDARY BATTERY INSULATING POROUS LAYER

(71) Applicant: Sumitomo Chemical Company, Limited, Tokyo (JP)

(72) Inventors: Syusaku Hara, Niihama (JP); Chikae Yoshimaru, Osaka (JP); Junji Suzuki, Niihama (JP); Hiroki Hashiwaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 210 days.

(21) Appl. No.: 15/593,375

(22) Filed: May 12, 2017

(65) Prior Publication Data

US 2018/0301681 A1    Oct. 18, 2018

(30) Foreign Application Priority Data

Apr. 14, 2017   (JP) ................. 2017-080836

(51) Int. Cl.
  *H01M 2/16*      (2006.01)
  *H01M 10/052*    (2010.01)
  *H01M 10/0585*   (2010.01)

(52) U.S. Cl.
  CPC ....... *H01M 2/1686* (2013.01); *H01M 2/1646* (2013.01); *H01M 2/1653* (2013.01); *H01M 10/052* (2013.01); *H01M 10/0585* (2013.01); *Y02E 60/122* (2013.01)

(58) Field of Classification Search
  CPC .......... H01M 2/1686; H01M 10/0585; H01M 10/052; H01M 2/1653; H01M 2/1646
  See application file for complete search history.

(56) References Cited

U.S. PATENT DOCUMENTS

| | | | |
|---|---|---|---|
| 9,938,390 B2 * | 4/2018 | Storti | ............... C08F 2/001 |
| 2010/0068612 A1 | 3/2010 | Nishikawa | |
| 2015/0291760 A1 * | 10/2015 | Storti | ............... C08F 2/001 |
| | | | 521/38 |

FOREIGN PATENT DOCUMENTS

| | | |
|---|---|---|
| JP | 2007-320145 A | 12/2007 |
| JP | 200921265 A | 1/2009 |
| JP | 2013-171679 A | 9/2013 |

* cited by examiner

*Primary Examiner* — Laura Weiner
(74) *Attorney, Agent, or Firm* — Panitch Schwarze Belisario & Nadel LLP (57) ABSTRACT

The present invention provides a nonaqueous electrolyte secondary battery insulating porous layer having an excellent charge resistance characteristic. The nonaqueous electrolyte secondary battery insulating porous layer has a fractal dimension of 2.42 to 2.60, the fractal dimension being calculated from a three-dimensional image showing a void part and a porous layer part on respective two gradation levels, the three-dimensional image being prepared by analyzing images of cross sections obtained by making observation at intervals of 20 nm in a thickness direction from a surface of the nonaqueous electrolyte secondary battery insulating porous layer by FIB-SEM measurement at a magnification of 6500 times.

4 Claims, 1 Drawing Sheet

FIG. 1

NONAQUEOUS ELECTROLYTE SECONDARY BATTERY INSULATING POROUS LAYER

This Nonprovisional application claims priority under 35 U.S.C. § 119 on Patent Application No. 2017-080836 filed in Japan on Apr. 14, 2017, the entire contents of which are hereby incorporated by reference.

TECHNICAL FIELD

The present invention relates to (i) an insulating porous layer for a nonaqueous electrolyte secondary battery (hereinafter referred to as a "nonaqueous electrolyte secondary battery insulating porous layer"), (ii) a laminated separator for a nonaqueous electrolyte secondary battery (hereinafter referred to as a "nonaqueous electrolyte secondary battery laminated separator"), (iii) a member for a nonaqueous electrolyte secondary battery (hereinafter referred to as a "nonaqueous electrolyte secondary battery member"), and (iv) a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

An example of a separator known to be used for such a nonaqueous electrolyte secondary battery is a laminated separator in which a porous layer containing a filler and a resin is disposed on at least one surface of a porous base material containing polyolefin as a main component.

For example, Patent Literature 1 discloses a nonaqueous secondary battery laminated separator in which a heat-resistant porous layer containing an inorganic filler and containing also aromatic polyamide as a main component is disposed on at least one surface of a porous base material.

CITATION LIST

Patent Literature

[Patent Literature 1]
Japanese Patent Application Publication, Tokukai, No. 2009-21265 (Publication Date: Jan. 29, 2009)

SUMMARY OF INVENTION

Technical Problem

However, a nonaqueous electrolyte secondary battery, which includes a conventional porous layer as disclosed in Patent Literature 1, is not sufficient in terms of charge resistance.

Solution to Problem

The present invention includes the following [1] through [4]:
[1] A nonaqueous electrolyte secondary battery insulating porous layer including:
a thermoplastic resin,
the nonaqueous electrolyte secondary battery insulating porous layer having a fractal dimension of 2.42 to 2.60, the fractal dimension being calculated from a three-dimensional image showing a void part and a solid content part on respective two gradation levels, the three-dimensional image being prepared by analyzing images of cross sections obtained by making observation at intervals of 20 nm in a thickness direction from a surface of the nonaqueous electrolyte secondary battery insulating porous layer with use of a FIB-SEM having a magnification of 6500 times.
[2] A nonaqueous electrolyte secondary battery laminated separator including:
a polyolefin porous film; and
a nonaqueous electrolyte secondary battery insulating porous layer recited in [1].
[3] A nonaqueous electrolyte secondary battery member including:
a cathode;
a nonaqueous electrolyte secondary battery insulating porous layer described in [1] or a nonaqueous electrolyte secondary battery laminated separator described in [2]; and
an anode,
the cathode, the nonaqueous electrolyte secondary battery insulating porous layer or the nonaqueous electrolyte secondary battery laminated separator, and the anode being arranged in this order.
[4] A nonaqueous electrolyte secondary battery including:
a nonaqueous electrolyte secondary battery insulating porous layer described in [1] or a nonaqueous electrolyte secondary battery laminated separator described in [2].

Advantageous Effects of Invention

A nonaqueous electrolyte secondary battery including a nonaqueous electrolyte secondary battery insulating porous layer in accordance with an embodiment of the present invention advantageously has excellent charge resistance.

DESCRIPTION OF EMBODIMENTS

The following description will discuss an embodiment of the present invention. Note, however, that the present invention is not limited to configurations described below, but can be altered in many ways by a person skilled in the art within the scope of the Claims. An embodiment derived from a proper combination of technical means disclosed in different embodiments is also encompassed in the technical scope of the present invention. Note that unless specified otherwise, any numerical range expressed as "A to B" herein means "not less than A and not greater than B".

Embodiment 1: Nonaqueous Electrolyte Secondary Battery Insulating Porous Layer A nonaqueous electrolyte secondary battery insulating porous layer in accordance with Embodiment 1 of the present invention (hereinafter also referred to simply as "porous layer") is a nonaqueous electrolyte secondary battery insulating porous layer including a thermoplastic resin, the nonaqueous electrolyte secondary battery insulating porous layer having a fractal dimension of 2.42 to 2.60, the fractal dimension being calculated from a three-dimensional image showing a void part and a solid content part on respective two gradation levels, the three-dimensional image being prepared by analyzing images of cross sections obtained by making observation at intervals of 20 nm in a thickness direction from a surface of the nonaqueous electrolyte secondary battery insulating porous layer with use of a FIB-SEM having a magnification of 6500 times.

A porous layer in accordance with an embodiment of the present invention can be used as a constituent member of a nonaqueous electrolyte secondary battery, preferably as a constituent member of a nonaqueous electrolyte secondary battery laminated separator. Specifically, the porous layer can form a nonaqueous electrolyte secondary battery laminated separator in accordance with an embodiment of the present invention by being disposed on one surface or both surfaces of a polyolefin porous film (hereinafter also referred to as a "porous base material") included in a nonaqueous electrolyte secondary battery laminated separator.

The porous layer includes a thermoplastic resin. The porous layer has many pores therein, the pores being connected to one another, so that a gas, a liquid, or the like can pass through the porous layer from one surface of the porous layer to the other. In a case where the porous layer is used as a constituent member of a nonaqueous electrolyte secondary battery laminated separator, the porous layer can serve as an outermost layer of the laminated separator, the outermost layer coming into contact with an electrode.

<Thermoplastic Resin>

The thermoplastic resin to be included in the porous layer is preferably insoluble in an electrolyte of a battery and is preferably electrochemically stable when the battery is in normal use. Specific examples of the thermoplastic resin encompass: polyolefins such as polyethylene, polypropylene, polybutene, and an ethylene-propylene copolymer; fluorine-containing resins such as polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer, and any of these fluorine-containing resins which is a fluorine-containing rubber having a glass transition temperature of equal to or less than 23° C.; aromatic polymers; polycarbonate; polyacetal; rubbers such as a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate; resins with a melting point or glass transition temperature of not lower than 180° C. such as polysulfone and polyester; water-soluble polymers such as polyvinyl alcohol, polyethylene glycol, cellulose ether, sodium alginate, polyacrylic acid, polyacrylamide, and polymethacrylic acid.

The thermoplastic resin included in the porous layer in accordance with an embodiment of the present invention is preferably an aromatic polymer. Note that "aromatic polymer" herein refers to a polymer in which a structural unit constituting a main chain contains an aromatic ring. That is, "aromatic polymer" means that monomers which are a raw material of the thermoplastic resin contain aromatic compounds.

Specific examples of the aromatic polymer encompass aromatic polyamide, aromatic polyimide, aromatic polyester, aromatic polycarbonate, aromatic polysulfone, and aromatic polyether. Preferable examples of the aromatic polymer encompass aromatic polyamide, aromatic polyimide, and aromatic polyester.

The aromatic polymer is preferably a wholly aromatic polymer in which a main chain has no aliphatic carbon.

Common names of polymers described herein each indicate a main binding type of the polymer. For example, in a case where a polymer contained in the thermoplastic resin in accordance with an embodiment of the present invention is an aromatic polymer referred to as "aromatic polyester", "aromatic polyester" indicates that not less than 50% of bonds constituting a main chain in molecules of the aromatic polymer are ester bonds. Therefore, the aromatic polymer referred to as "aromatic polyester" can contain, in bonds constituting a main chain, bonds other than ester bonds (such as amide bonds and imide bonds).

The thermoplastic resin contained in the porous layer in accordance with an embodiment of the present invention can be a single type of resin or a mixture of two or more types of resins.

Examples of the aromatic polyamide encompass: wholly aromatic polyamides such as para-aramid and meta-aramid; semi-aromatic polyamide; 6T nylon; 6I nylon; 8T nylon; 10T nylon; denatured 6T nylon; denatured 6I nylon; denatured 8T nylon; denatured 10T nylon; and copolymers of these.

The aromatic polyimide is preferably a wholly aromatic polyimide prepared through condensation polymerization of an aromatic dianhydride and an aromatic diamine. Specific examples of the dianhydride encompass pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Specific examples of the diamine encompass oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine.

More preferable examples of the aromatic polyimide encompass an aromatic polyimide, which is soluble in a solvent, such as a polyimide that is a polycondensate obtained from 3,3',4,4'-diphenyl sulfone tetracarboxylic dianhydride and aromatic diamine.

Examples of the aromatic polyester encompass the following polyesters. These aromatic polyesters are preferably wholly aromatic polyesters.

(1) A polymer obtained by polymerizing an aromatic hydroxycarboxylic acid, an aromatic dicarboxylic acid, and an aromatic diol, (2) A polymer obtained by polymerizing aromatic hydroxycarboxylic acids of identical type or differing types, (3) A polymer obtained by polymerizing an aromatic dicarboxylic acid and an aromatic diol, (4) A polymer obtained by polymerizing (i) an aromatic hydroxycarboxylic acid, (ii) an aromatic dicarboxylic acid, and (iii) an aromatic amine having a phenolic hydroxide group, (5) A polymer obtained by polymerizing (i) an aromatic dicarboxylic acid and (ii) an aromatic amine having a phenolic hydroxide group, (6) A polymer obtained by polymerizing an aromatic hydroxycarboxylic acid, an aromatic dicarboxylic acid, and an aromatic diamine, (7) A polymer obtained by polymerizing an aromatic hydroxycarboxylic acid, an aromatic dicarboxylic acid, an aromatic diamine, and an aromatic diol, (8) A polymer obtained by polymerizing (i) an aromatic hydroxycarboxylic acid, (ii) an aromatic dicarboxylic acid, (iii) an aromatic amine having a phenolic hydroxide group, and (iv) an aromatic diol.

Of the aromatic polyesters above, the aromatic polyesters of (4) through (7) or (8) are preferable in view of solubility in a solvent. Excellent solubility in a solvent allows an increase in productivity of a porous layer.

Note that instead of using an aromatic hydroxycarboxylic acid, aromatic dicarboxylic acid, an aromatic diol, an aromatic diamine, or an aromatic amine having a phenolic hydroxide group, it is possible to use (i) an ester-forming derivative of any of these or (ii) an amide-forming derivative of any of these.

Examples of the ester-forming derivatives of carboxylic acids and amide-forming derivatives of carboxylic acids encompass (i) compounds, such as an acid chloride and an acid anhydride, in each of which a carboxyl group is a highly reactive derivative so that a polyester formation reaction or a polyamide formation reaction is promoted and (ii) compounds in each of which an ester or an amide is formed by a carboxyl group and alcohols, an ethylene glycol, or an amine, any of which generates an polyester or a polyamide by an ester exchange reaction or an amide exchange reaction, respectively.

Examples of the ester-forming derivative of the phenolic hydroxide group encompass a compound in which an ester is formed by a phenolic hydroxide group and carboxylic acids so as to generate polyester by an ester exchange reaction.

Examples of an amide-forming derivative of an amino group encompass a compound in which an amide is formed by an amino group and carboxylic acids so as to generate polyamide by an amide exchange reaction.

Alternatively, the aromatic hydroxycarboxylic acid, the aromatic dicarboxylic acid, the aromatic diol, the aromatic amine having a phenolic hydroxide group, and the aromatic diamine can each be substituted by an alkyl group such as a methyl group or an ethyl group or by an aryl group such as a phenyl group, provided that an ester forming property or an amide forming property is not impaired.

Examples of a repeating structural unit of the wholly aromatic polyester encompass, but are not limited to, the following repeating structural units.

A repeating structural unit derived from an aromatic hydroxycarboxylic acid:

[Chem. 1]

(A$_1$)

(A$_2$)

(A$_3$)

(A$_4$)

(A$_5$)

The above repeating structural unit can be substituted by an alkyl group or an aryl group.

A repeating structural unit derived from an aromatic dicarboxylic acid:

[Chem. 2]

(B$_1$)

(B$_2$)

(B$_3$)

(B$_4$)

(B$_5$)

(B$_6$)

(B$_7$)

(B$_8$)

The above repeating structural unit can be substituted by an alkyl group or an aryl group.

A repeating structural unit derived from an aromatic diol:

[Chem. 3]

The above repeating structural unit can be substituted by an alkyl group or an aryl group.

A repeating structural unit derived from an aromatic amine having a phenolic hydroxide group:

[Chem. 4]

The above repeating structural unit can be substituted by an alkyl group or an aryl group. All or part of hydrogen atoms binding to nitrogen atoms can be substituted by an alkyl group or an acyl group.

A repeating structural unit derived from an aromatic diamine:

[Chem. 5]

The above repeating structural unit can be substituted by a halogen atom, an alkyl group or an aryl group.

Ordinarily, the alkyl group, by which the repeating structural unit can be substituted, is, for example, a C1-C10 alkyl group which is preferably a methyl group, an ethyl group, a propyl group, or a butyl group. Ordinarily, the aryl group, by which the repeating structural unit can be substituted, is, for example, a C6-C20 aryl group which is preferably a phenyl group. All or part of hydrogen atoms binding to nitrogen atoms can be substituted by an alkyl group or an acyl group. Examples of the halogen atom by which the repeating structural unit can be substituted encompass a fluorine atom, a chlorine atom, and a bromine atom.

In view of a further increase in heat resistance of the nonaqueous electrolyte secondary battery laminated separator in accordance with an embodiment of the present invention, the aromatic polyester preferably contains a repeating unit represented by the above formula ($A_1$), ($A_3$), ($B_1$), ($B_2$) or ($B_3$).

Examples of a preferable combination of the repeating structural units encompass the following combinations (a) through (d):

(a):
a combination of the repeating structural units ($A_1$), ($B_2$), and ($D_1$),
a combination of the repeating structural units ($A_3$), ($B_2$), and ($D_1$),
a combination of the repeating structural units ($A_1$), ($B_1$), ($B_2$), and ($D_1$),
a combination of the repeating structural units ($A_3$), ($B_1$), ($B_2$), and ($D_1$),
a combination of the repeating structural units ($A_3$), ($B_3$), and ($D_1$), or
a combination of the repeating structural units ($B_1$), ($B_2$) or ($B_3$), and ($D_1$).

(b): a combination in which all or part of ($D_1$) in the combination (a) is substituted by ($D_2$).

(c): a combination in which part of ($A_1$) in the combination (a) is substituted by ($A_3$).

(d): a combination in which all or part of ($D_1$) in the combination (a) is substituted by ($C_1$) or ($C_3$).

(e): a combination in which all or part of ($D_1$) in the combination (a) is substituted by ($E_1$) or ($E_5$).

Examples of a more preferable combination encompass (i) a repeating structural unit, in an amount of 10 mol % to 50 mol %, derived from at least one compound selected from the group consisting of p-hydroxybenzoic acid and 2-hydroxy-6-naphthoic acid, (ii) a repeating structural unit, in an amount of 10 mol % to 50 mol %, derived from at least one compound selected from the group consisting of 4-hydroxyaniline and 4,4'-diaminodiphenyl ether, (iii) a repeating structural unit, in an amount of 10 mol % to 50 mol %, derived from at least one compound selected from the group consisting of a terephthalic acid and an isophthalic acid, and (iv) a repeating structural unit, in an amount of 10 mol % to 19 mol %, derived from hydrochinone. Examples of a further preferable combination encompass (i) a repeating structural unit, in an amount of 10 mol % to 35 mol %, derived from 4-hydroxyaniline and (ii) a repeating structural unit, in an amount of 20 mol % to 45 mol %, derived from an isophthalic acid.

A method of preparing the thermoplastic resin can be a method known to a person skilled in the art, and is not limited to any particular one. A method of preparing an aromatic polyester will be described below as an example of the method for preparing the thermoplastic resin.

Examples of the method of preparing an aromatic polyester encompass a method in which (i) an aromatic hydroxycarboxylic acid, an aromatic diol, an aromatic amine having a phenolic hydroxide group, or an aromatic diamine is subjected to acylation (acylation reaction) by an excess amount of fatty acid anhydride, so that an acylated product is obtained and (ii) the acylated product thus obtained and an aromatic hydroxycarboxylic acid and/or an aromatic dicarboxylic acid are subjected to ester exchange or amide exchange so as to be polymerized.

In the acylation reaction, an amount of the fatty acid anhydride to be added is preferably 1.0 equivalent to 1.2 equivalents with respect to a total amount of the phenolic hydroxide group and the amino group combined.

The acylation reaction is to last preferably 5 minutes to 10 hours at 130° C. to 180° C., and more preferably 10 minutes to 3 hours at 140° C. to 160° C.

Examples of the fatty acid anhydride to be used for the acylation reaction encompass, but are not particularly limited to, acetic anhydride, propionic anhydride, butyric anhydride, and isobutyric anhydride. Two or more of these can be mixed when used. In view of cost and workability, acetic anhydride is preferable.

During the polymerization through the ester exchange or amide exchange, an amount of the acyl group of the acylated product is preferably 0.8 equivalents to 1.2 equivalents with respect to an amount of the carboxyl group. A polymerization temperature is preferably not more than 400° C., and more preferably not more than 350° C.

Note that the acylation reaction and the polymerization through the ester exchange or amide exchange can be carried out in the presence of a catalyst. The catalyst can be a catalyst that is conventionally and publicly known as a polyester polymerization catalyst.

Polymerization through ester exchange or amide exchange is ordinarily melt polymerization. Alternatively, it is possible to carry out melt polymerization and solid phase polymerization in combination. Solid phase polymerization can be carried out by (i) extracting a polymer during a melt polymerization step, (ii) solidifying the extracted polymer, (iii) crushing the resultant polymer into a powder-like polymer or a flake-like polymer, and then (iv) subjecting the powder-like polymer or the flake-like polymer to publicly known solid phase polymerization. Specific examples of the solid phase polymerization encompass a method in which the powder-like polymer or the flake-like polymer in a solid-phase state is heated in an inert atmosphere such as nitrogen at 20° C. to 350° C. for 1 hour to 30 hours. Note that an aromatic polyester obtained after the solid phase polymerization can be pelletized by a publicly known method before being used.

In view of heat resistance of the porous layer, the thermoplastic resin preferably contains a heat-resistant resin. Examples of the heat-resistant resin encompass (i) aromatic polyamides such as a wholly aromatic polyamide (aramid resin) and a semi-aromatic polyamide, (ii) aromatic polyimides, (iii) polybenzimidazole, and (iv) polyurethane. Of these, the heat-resistant resin is more preferably a wholly aromatic polyamide. Examples of the wholly aromatic polyamide encompass para-aramid and meta-aramid. Of these, para-aramid is more preferable.

The thermoplastic resin can be, as a suitable example, a mixture of the aromatic polyester and the aromatic polyamide. In such a case, a ratio of a weight of the aromatic polyester to a total weight of the aromatic polyester and the aromatic polyamide combined [aromatic polyester/(aromatic polyester+aromatic polyamide)] is preferably not less than 10% by weight.

Examples of a method of preparing the aromatic polyamide encompass, but are not particularly limited to, condensation polymerization of para-oriented aromatic diamine and para-oriented aromatic dicarboxylic acid halide. In such a case, aromatic polyamide to be obtained substantially includes repeating units in which amide bonds are bonded at para positions or corresponding oriented positions (for example, oriented positions that extend coaxially or parallel in opposite directions such as the cases of 4,4'-biphenylene, 1,5-naphthalene, and 2,6-naphthalene) of aromatic rings. Specific examples of the aromatic polyamide encompass para-aramids each having a para-oriented structure or a structure corresponding to a para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly (paraphenylene-2,6-naphthalene dicarboxylic acid amide), poly(2-chloro-paraphenylene terephthalamide), and paraphenylene terephthalamide/2,6-dichloroparaphenylene terephthalamide copolymer.

The aromatic polyamide can be poly(paraphenylene terephthalamide) (hereinafter referred to as "PPTA"). A solution of the PPTA can be prepared by, for example, the following specific steps (1) through (4).

(1) N-methyl-2-pyrrolidone (hereinafter also referred to as "NMP") is introduced into a flask which is dried. Then, calcium chloride, which has been dried at 200° C. for 2 hours, is added. Then, the flask is heated to 100° C. to completely dissolve the calcium chloride.

(2) A temperature of the solution obtained in the step (1) is returned to room temperature, and then paraphenylenediamine (hereinafter abbreviated as "PPD") is added. Then, the PPD is completely dissolved.

(3) While a temperature of the solution obtained in the step (2) is maintained at 20±2° C., terephthalic acid dichloride (hereinafter referred to as "TPC") is added in 10 separate portions at approximately 5-minute intervals.

(4) While a temperature of the solution obtained in the step (3) is maintained at 20±2° C., the solution is matured for 1 hour, and is then stirred under reduced pressure for 30 minutes to eliminate air bubbles, so that the solution of the PPTA is obtained.

<Filler>

The porous layer in accordance with an embodiment of the present invention preferably further includes a filler. The filler is insulating, and can be made of any material selected from an organic powder, an inorganic powder, and a mixture of an organic powder and an inorganic powder.

Examples of the organic powder encompass powders made of organic matters such as: (i) a homopolymer of a monomer such as styrene, vinyl ketone, acrylonitrile, methyl methacrylate, ethyl methacrylate, glycidyl methacrylate, glycidyl acrylate, or methyl acrylate or (ii) a copolymer of two or more of such monomers; fluorine-based resins such as polytetrafluoroethylene, an ethylene tetrafluoride-propylene hexafluoride copolymer, an ethylene tetrafluoride-ethylene copolymer, and polyvinylidene fluoride; melamine resin; urea resin; polyolefin; and polymethacrylate. The filler can be made of one of these organic powders, or can be made of two or more of these organic powders mixed. Among these organic powders, a polytetrafluoroethylene powder is preferable in view of chemical stability.

Examples of the inorganic powder encompass powders made of inorganic matters such as a metal oxide, a metal nitride, a metal carbide, a metal hydroxide, a carbonate, and a sulfate. Specific examples of the inorganic powder encompass powders made of inorganic matters such as alumina, silica, titanium dioxide, aluminum hydroxide, and calcium carbonate. The filler can be made of one of these inorganic powders, or can be made of two or more of these inorganic powders mixed. Among these inorganic powders, an alumina powder is preferable in view of chemical stability. It is more preferable that particles by which the filler is constituted be all alumina particles. It is a still more preferable embodiment that (i) the particles by which the filler is constituted are all alumina particles and (ii) all or part of the alumina particles are substantially spherical alumina particles. Note that in an embodiment of the present invention, the substantially spherical alumina particles include absolutely spherical particles.

According to an embodiment of the present invention, in a case where, for example, the particles by which the filler is constituted are all alumina particles, a weight of the filler relative to a total weight of the porous layer in accordance with an embodiment of the present invention is ordinarily 20% by weight to 95% by weight, and preferably 30% by weight to 90% by weight, although a filler content of the porous layer depends on a specific gravity of the material of the filler. The above ranges can be set as appropriate according to the specific gravity of the material of the filler.

Examples of a shape of the filler in accordance with an embodiment of the present invention encompass a substantially spherical shape, a plate-like shape, a pillar shape, a needle shape, a whisker-like shape, and a fibrous shape. Although any particle can be used to constitute the filler, substantially spherical particles are preferable because substantially spherical particles allow uniform pores to be easily made. In view of a strength property and smoothness of the porous layer, an average particle diameter of particles by which the filler is constituted is preferably 0.01 μm to 1 μm. Note that the average particle diameter is to be indicated by a value measured with the use of a photograph taken by a scanning electron microscope. Specifically, any 50 particles of particles captured in the photograph are selected, respective particle diameters of the 50 particles are measured, and then an average value of the particle diameters thus measured is used as the average particle diameter.

<Physical Properties of Porous Layer>

In a case where the porous layer is disposed on both surfaces of a porous base material, the physical properties in the following description regarding physical properties of the porous layer refers to at least physical properties of a porous layer disposed on a surface of the porous base material which surface faces a cathode of the nonaqueous electrolyte secondary battery.

In a case where a porous layer is disposed on one surface or both surfaces of the porous base material, a thickness of the porous layer is preferably 0.5 μm to 15 μm (per surface of the porous film), and more preferably 2 μm to 10 μm (per surface of the porous film), although the thickness of the porous layer can be decided as appropriate in view of a thickness of a nonaqueous electrolyte secondary battery laminated separator to be produced.

The thickness of the porous layer is preferably not less than 1 μm (not less than 0.5 μm per surface of the porous film). This is because, with such a thickness, (i) an internal short circuit of the battery, which internal short circuit is caused by breakage or the like of the battery, can be sufficiently prevented in a nonaqueous electrolyte secondary battery laminated separator which includes the porous layer and (ii) an amount of an electrolyte retained in the porous layer can be maintained. Meanwhile, a total thickness of both the surfaces of the porous layer is preferably not more than 30 μm (not more than 15 μm per surface of the porous film). This is because, with such a thickness, (i) it is possible to restrict an increase in resistance to permeation of ions such as lithium ions all over the nonaqueous electrolyte secondary battery laminated separator which includes the porous layers, (ii) it is possible to prevent the cathode from deteriorating in a case where a charge-discharge cycle is repeated, so that a rate characteristic and/or a cycle characteristic is/are prevented from deteriorating, and (iii) an increase in distance between the cathode and an anode is restricted, so that the nonaqueous electrolyte secondary battery can be prevented from being large in size.

<Fractal Dimension>

A "fractal dimension" of a porous layer in accordance with an embodiment of the present invention is calculated by the following method.

A value of a fractal dimension is calculated from a three-dimensional image showing a void part and a solid content part on respective two gradation levels, the three-dimensional image being obtained from FIB-SEM images of cross sections of a nonaqueous electrolyte secondary battery insulating porous layer which is embedded in a resin, the cross sections being obtained at intervals of 20 nm in a thickness direction from a surface of the nonaqueous electrolyte secondary battery laminated separator (i.e. surface on a side on which the porous layer is located).

"FIB-SEM" means a process of (i) processing a sample with the use of a focused ion beam (FIB), (ii) preparing (exposing) a cross section of the sample, and (iii) observing the cross section with the use of a scanning electron microscope (SEM). An image (electron micrograph) of the cross section, which image is obtained as a result of the process, is herein referred to as "FIB-SEM image". The "solid content part" refers to a part other than the void part of the porous layer. In other words, the "solid content part" refers to a part constituted by a solid content such as a resin and a filler.

Specifically, a fractal dimension of the porous layer in accordance with an embodiment of the present invention can be calculated by, for example, the following method.

First, the porous layer of the nonaqueous electrolyte secondary battery laminated separator is impregnated with an epoxy resin, so that a void part of the porous layer is filled with the epoxy resin. Then, the epoxy resin is cured, so that a sample to be measured (hereinafter referred to as "measurement sample") is prepared. With the use of a FIB-SEM (HELIOS600 manufactured by FEI), FIB processing is carried out to the measurement sample in a depth direction (direction toward the inside the measurement sample) from a surface of the measurement sample (i.e. surface on a side on which the porous layer is located), so that a processed surface (cross section) is made. In so doing, the FIB processing is continued until a porous structure is observed in a cross section close to the surface of the measurement sample. Specifically, a cross section that is a cross section at which the porous structure is observed and which is closest possible to the surface of the measurement sample is the processed surface (i.e. top surface of the rectangular parallelepiped). The processed surface thus obtained is subjected to SEM observation (reflection electron image) at an acceleration voltage of 2.1 kV and with a magnification of 6500 times.

Figure 1:
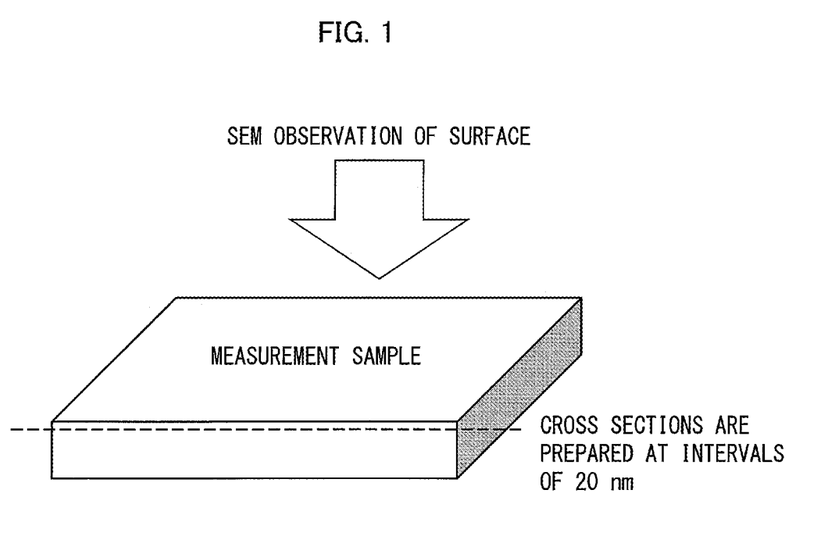
FIG. 1 is a view schematically illustrating a method of obtaining sequential slice images from a measurement sample for calculation of a "fractal dimension" of the present invention.

After the SEM observation, FIB processing is carried out to the sample by a thickness of 20 nm in a depth direction of the sample (i.e. direction along the (film) thickness of the porous layer), so that a new processed surface is obtained. Then, the new processed surface thus obtained is subjected to SEM observation (reflection electron image). FIB processing is likewise carried out from the new processed surface by a thickness of 20 nm, so that a further new processed surface is obtained. Then, the further new processed surface is subjected to SEM observation (reflection electron image). By thus repeating FIB processing at thickness intervals of 20 nm and SEM observation of a processed surface, sequential slice images all over the porous layer in the thickness direction is obtained (see FIG. 1).

Then, positions of the sequential slice images are corrected with the use of image analyzing software (manufactured by Visualization Sciences Group; Avizo ver. 6.0), so that corrected sequential slice images are obtained. Scales are as follows: 19.2 nm/pix in an X-axis and in a Y-axis, and 20 nm/pix in Z-axis.

Then, the corrected sequential slice images are trimmed to a rectangular parallelepiped having the thickness of the porous layer, so that a three-dimensional image to be analyzed (hereinafter referred to as "analysis three-dimensional image") is obtained. The analysis three-dimensional image thus obtained is subjected to three-dimensional quantitative analysis with the use of quantitative analyzing software TRI/3D-BON (manufactured by Ratoc System Engineering Co., Ltd.), so that a fractal dimension is calculated.

Specifically, the software is used to convert the analysis three-dimensional image into a two-gradation-level image by Auto-LW so as to distinguish between a solid content part and a void part (i.e. between, in the measurement sample, (i) a part formed by the solid content constituting the porous layer and (ii) a part formed by the epoxy resin) in each section.

Note that in a case where an aggregate of fine particles such as the filler or the like contained in the solid content part exhibits a halftone contrast, only a part of the halftone contrast is extracted and superimposed on the resin part by use of an image calculation function. This allows an analysis three-dimensional image, which shows two gradation levels, to be obtained while an aggregate of the fine particles is also regarded as a solid content part.

Note that any other image analyzing software or program having an identical function can be used for analyzing a fractal dimension, provided that reproducibility of the results of the analysis is sufficient. Examples of the other software encompass image analyzing software such as "AT-Image".

A fractal dimension is an index quantitatively showing complexity of a structure of an interface between a void part and a solid content part. Specifically, a fractal dimension ranges from 2 to 3. In a case where the fractal dimension is 2, a flat surface (two dimensions) is indicated. In a case where the fractal dimension is 3, the fractal dimension means a three-dimensional structure is indicated.

Specifically, a fractal dimension closer to 3 indicates that (i) a void structure of a porous layer is more complex and (ii) unevenness of a void surface (interface) is greater. Meanwhile, a fractal dimension closer to 2 indicates that (i) a void structure of a porous layer is simpler and (ii) unevenness of a void surface (interface) is less, that is, the void surface is similar to a flat surface.

If the fractal dimension is excessively small, then a void structure of a porous layer is simple. This causes a gas, which is derived from oxidative decomposition of an electrolyte or the like produced as a byproduct at a surface of a cathode during charge of a battery, to easily enter the porous layer. Therefore, permeation of lithium ions is inhibited, and consequently charge resistance is increased. Meanwhile, if fractal dimension is excessively large, then a void structure of a porous layer is complex. This causes a traveling distance of lithium ions to be long, and consequently causes an increase in charge resistance. For these reasons, a fractal dimension is to fall within a suitable range of preferably 2.42 to 2.60, and more preferably 2.43 to 2.58.

<Porous Layer Production Method>

The porous layer in accordance with an embodiment of the present invention can be produced by, for example, (i) dissolving the thermoplastic resin in a solvent and, optionally, dispersing the filler, so as to prepare a coating solution for forming a porous layer and then (ii) coating a base material with the coating solution and then drying the coating solution, so as to deposit the porous layer in accordance with an embodiment of the present invention. Examples of the base material encompass (i) a porous base material (polyolefin porous film) described later and (ii) an electrode.

The solvent (dispersion medium) is not limited to any particular one, provided that (i) the solvent does not have an adverse effect on the base material, (ii) the solvent allows the thermoplastic resin to be uniformly and stably dissolved in the solvent, (iii) the solvent allows the filler to be uniformly and stably dispersed in the solvent. Specific examples of the solvent (dispersion medium) encompass N-methylpyrrolidone, N,N-dimethylacetamide, and N,N dimethylformamide. Only one of these solvents (dispersion media) can be used, or two or more of these solvents (dispersion media) can be used in combination.

The coating solution can be formed by any method, provided that the coating solution can satisfy conditions such as a resin solid content (resin concentration) and an amount of the filler, each of which conditions is necessary to obtain a desired porous layer. Specific examples of the method encompass a method in which a filler is added to and dispersed in a solution which is obtained by dissolving the thermoplastic resin in a solvent (dispersion medium). In a case where the filler is added, the filler can be dispersed in a solvent (dispersion medium) with the use of a conventionally and publicly known dispersing device, examples of which encompass a three-one motor, a homogenizer, a medium type dispersing device, and a pressure type dispersing device.

A method of coating the base material with the coating solution encompass publicly known coating methods such as a knife coater method, a blade coater method, a bar coater method, a gravure coater method, and a die coater method.

A method of removing the solvent (dispersion medium) is generally a drying method. Examples of the drying method encompass natural drying, air-blowing drying, heat drying, and drying under reduced pressure. Note, however, any method can be used, provided that the solvent (dispersion medium) can be sufficiently removed. In addition, drying can be carried out after the solvent (dispersion medium) contained in the coating solution is replaced with another solvent. Specific examples of the method, in which the solvent (dispersion medium) is replaced with another solvent and then drying is carried out, encompass a method in which (i) the solvent (dispersion medium) is replaced with a poor solvent having a low boiling point, such as water, alcohol, or acetone, (ii) the porous layer is deposited, and then (iii) the drying is carried out.

Examples of a method of controlling a fractal dimension of the porous layer in accordance with an embodiment of the present invention to 2.42 to 2.60 encompass, but are not particularly limited to, a method in which conditions for producing the porous layer are adjusted to suitable conditions.

Examples of the method in which the production conditions are adjusted to suitable conditions encompass a method in which conditions for depositing a resin from a coating solution with which the base material is coated are adjusted to suitable conditions. If the conditions for depositing the resin are excessively strict, then local deposition of the resin at an outermost surface causes deposition of the resin inside the coating solution to be restricted. This causes a speed, at which the resin is deposited in the coating solution, to be slow. Consequently, complexity of an internal structure (void shape) tends to be reduced, and therefore a fractal dimension tends to be small.

Examples of suitable depositing conditions in which an aramid resin is deposited from a coating solution containing the aramid resin encompass a humidifying condition in which (i) temperature is set to 40° C. to 80° C. and (ii) relative humidity is set to not more than 70%. The temperature is more preferably 50° C. to 70° C. Under such humidifying conditions, slowness of deposition of a resin in a coating solution resulting from local deposition of the resin at an outermost surface of the coating solution is reduced, so that the aramid is deposited at a proper speed in the coating solution. This allows an internal structure (void shape) of a porous layer, which is to be obtained, to be complex to a proper extent. Note that dependency of a fractal dimension of a porous layer on relative humidity during deposition tends to be remarkable in a case where the porous layer contains a high proportion of aramid resin.

It is possible to adjust a fractal dimension of a porous layer by combining two or more kinds of thermoplastic resins. Examples of a combination of two kinds of thermoplastic resins encompass a combination of (i) a thermoplastic resin in which a binding type constituting a main chain contains a different binding type in a large amount and (ii) a thermoplastic resin in which a binding type constituting a main chain contains a different binding type in a small amount. It is deemed that in a case where two kinds of such thermoplastic resins are combined, a difference between speeds at which respective resins are deposited becomes large, so that an internal structure of a porous layer to be obtained becomes complex. Therefore, in a case where the amount of the different binding type which is contained in a large amount in the thermoplastic resin is larger, the fractal dimension of the porous layer tends to be higher. The concept that "a binding type constituting a main chain contains a different binding type" means that in a case where, for example, a thermoplastic resin is an aromatic polyester, not less than 50% of bonds constituting a main chain is ester bonds while bonds of another binding type such as amide bonds other than the ester bonds are also contained. Furthermore, in a case where the thermoplastic resin is an aromatic polymer, a bent structural unit such as methaphenylene is also a different binding type. That is, in a case where (i) a thermoplastic resin in which a binding type constituting a main chain contains different binding types in a large amount is an aromatic polyester and (ii) the different binding types such as amide bonds and methaphenylene which are contained in the aromatic polyester are larger in amount, a fractal dimension tends to be larger.

By combining the above-described conditions and the like as needed, it is possible to control a value of the fractal dimension of the porous layer to 2.42 to 2.60.

Embodiment 2: Nonaqueous Electrolyte Secondary Battery Laminated Separator

A nonaqueous electrolyte secondary battery laminated separator in accordance with Embodiment 2 of the present invention includes (i) a polyolefin porous film and (ii) the porous layer in accordance with Embodiment 1 of the present invention. Preferably, the nonaqueous electrolyte secondary battery laminated separator in accordance with Embodiment 2 of the present invention includes (i) a polyolefin porous film and (ii) a porous layer in accordance with Embodiment 1 of the present invention which porous layer is disposed on at least one surface of the polyolefin porous film.

Since a nonaqueous electrolyte secondary battery laminated separator in accordance with an embodiment of the present invention includes a nonaqueous electrolyte secondary battery insulating porous layer in accordance with an embodiment of the present invention, charge resistance is advantageously reduced.

<Polyolefin Porous Film>

A polyolefin porous film used in an embodiment of the present invention is a porous film containing a polyolefin-based resin as a main component. The porous film is preferably a microporous film. Specifically, the porous film, which contains a polyolefin-based resin as a main component, has pores therein, the pores being connected to one another, so that a gas and a liquid can pass through the porous film from one surface of the porous film to the other. The porous film can include a single layer or a plurality of layers.

The "porous film containing a polyolefin-based resin as a main component" herein means that a polyolefin-based resin component is contained in the porous film at a proportion of ordinarily not less than 50% by volume, preferably not less than 90% by volume, and more preferably not less than 95% by volume of an entire portion of a material of the porous film. The polyolefin-based resin contained in the polyolefin porous film preferably contains a high molecular weight component having a weight-average molecular weight of $5 \times 10^5$ to $15 \times 10^6$. It is preferable that a polyolefin-based resin having a weight-average molecular weight of not less than 1,000,000 be contained as a polyolefin-based resin in the porous film. This is because, in such a case, there can be an increase in (i) strength of an entire portion of the polyolefin porous film and (ii) strength of an entire portion of a nonaqueous electrolyte secondary battery laminated separator which includes the polyolefin porous film and the porous layer.

Examples of the polyolefin-based resin encompass high molecular weight homopolymers (such as polyethylene, polypropylene, and polybutene) and high molecular weight copolymers (such as ethylene-propylene copolymer) produced through polymerization of ethylene, propylene, 1-butene, 4-methyl-1-pentene, or 1-hexene. The polyolefin porous film is a layer which includes one of these polyolefin-based resins and/or two or more of these polyolefin-based resins. A high molecular weight polyethylene-based resin containing ethylene as a main component is particularly preferable in view of the fact that such a polyethylene-based resin can prevent (shutdown) the flow of an excessively large current at a low temperature. Note that the polyolefin porous film can contain any component other than the polyolefin-based resin, provided that the component does not impair the function of the polyolefin porous film.

Air permeability of the porous film in terms of Gurley values is ordinarily 30 sec/100 cc to 500 sec/100 cc, and preferably 50 sec/100 cc to 300 sec/100 cc. If the air permeability of the porous film falls within these ranges, sufficient ion permeability can be imparted to (i) a nonaqueous electrolyte secondary battery separator in a case where the porous film is used as the nonaqueous electrolyte secondary battery separator or (ii) a nonaqueous electrolyte secondary battery laminated separator in a case where the porous film is used as a member of the nonaqueous electrolyte secondary battery laminated separator including a porous layer described later.

In regard to a thickness of the porous film, a less thickness can cause energy density of the battery to be higher. Therefore, the thickness of the porous film is preferably not more than 20 μm, more preferably not more than 16 μm, and still more preferably not more than 11 μm. In view of film strength, the thickness of the porous film is preferably not less than 4 μm. That is, the thickness of the porous film is preferably 4 μm to 20 μm.

A method of producing the porous film can be any publicly known method, and is not limited to any particular one. For example, as disclosed in Japanese Patent No. 5476844, the porous film can be produced by (i) adding a filler to a thermoplastic resin, (ii) forming, into a film, the thermoplastic resin containing the filler, and then (iii) removing the filler.

Specifically, in a case where, for example, the porous film is made of polyolefin resin containing ultra-high molecular weight polyethylene and low molecular weight polyolefin which has a weight-average molecular weight of not more than 10,000, the porous film is preferably produced by, in view of production costs, a method including the following steps (1) through (4):

(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of an inorganic filler such as calcium carbonate, so that a polyolefin resin composition is obtained;
(2) forming the polyolefin resin composition into a sheet;
(3) removing the inorganic filler from the sheet obtained in the step (2); and
(4) stretching the sheet obtained in the step (3).

Alternatively, the porous filmi can be produced through a method disclosed in the above-described Patent Literature.

Alternatively, the porous film in accordance with an embodiment of the present invention can be a commercial product having the above-described characteristics.

<Nonaqueous Electrolyte Secondary Battery Laminated Separator Production Method>

The nonaqueous electrolyte secondary battery laminated separator in accordance with an embodiment of the present invention can be produced by, for example, a method in which the polyolefin porous film is used as a base material in the above-described method of producing the porous layer in accordance with an embodiment of the present invention.

<Physical Properties of Nonaqueous Electrolyte Secondary Battery Laminated Separator>

In regard to a thickness of the nonaqueous electrolyte secondary battery laminated separator in accordance with an embodiment of the present invention, a less thickness can allow energy density of the battery to be higher, and is therefore preferable. However, a less thickness also leads to less strength, and there is therefore a limitation on a reduction in the thickness during production of the nonaqueous electrolyte secondary battery laminated separator. In view of these factors, the nonaqueous electrolyte secondary battery laminated separator in accordance with an embodiment of the present invention has a thickness of preferably not more than 50 μm, more preferably not more than 25 μm, and still more preferably not more than 20 μm. In addition, the nonaqueous electrolyte secondary battery laminated separator preferably has a thickness of not less than 5 μm.

Air permeability of the nonaqueous electrolyte secondary battery laminated separator in accordance with an embodiment of the present invention in terms of Gurley values is preferably 30 sec/100 cc to 1000 sec/100 cc, and more preferably 50 sec/100 cc to 800 sec/100 cc. In a case where the laminated body has air permeability falling within these ranges, the laminated body used as a nonaqueous electrolyte secondary battery separator can have sufficient ion permeability. If the air permeability is above these ranges, then it means that the laminated body has a high porosity and that a laminated structure is therefore rough. This poses a risk that strength of the laminated body may decrease, so that shape stability particularly at a high temperature may be insufficient. Meanwhile, if the air permeability is below these ranges, then the laminated body, which is used as a nonaqueous electrolyte secondary battery separator, may not have sufficient ion permeability. This may cause deterioration of the battery characteristic of the nonaqueous electrolyte secondary battery.

Note that the nonaqueous electrolyte secondary battery laminated separator in accordance with an embodiment of the present invention can include, as needed, a publicly known porous film(s) such as an adhesive layer and/or a protection layer in addition to the porous film and the porous layer, provided that the objective of an embodiment of the present invention is not impaired.

Embodiment 3: Nonaqueous Electrolyte Secondary Battery Member, Embodiment 4: Nonaqueous Electrolyte Secondary Battery A nonaqueous electrolyte secondary battery member in accordance with Embodiment 3 of the present invention is obtained by arranging a cathode, the nonaqueous electrolyte secondary battery insulating porous layer in accordance with Embodiment 1 of the present invention or the nonaqueous electrolyte secondary battery laminated separator in accordance with Embodiment 2 of the present invention, and an anode, the cathode, the nonaqueous electrolyte secondary battery insulating porous layer or the nonaqueous electrolyte secondary battery laminated separator, and the anode being arranged in this order.

A nonaqueous electrolyte secondary battery in accordance with Embodiment 4 of the present invention includes (i) the nonaqueous electrolyte secondary battery insulating porous layer in accordance with Embodiment 1 of the present invention or (ii) the nonaqueous electrolyte secondary battery laminated separator in accordance with Embodiment 2 of the present invention.

A nonaqueous electrolyte secondary battery in accordance with an embodiment of the present invention can be, for example, a nonaqueous secondary battery that achieves an electromotive force through doping and dedoping with lithium, and can include a nonaqueous electrolyte secondary battery member including a cathode, a nonaqueous electrolyte secondary battery insulating porous layer in accordance with an embodiment of the present invention, and an anode, the cathode, the nonaqueous electrolyte secondary battery insulating porous layer, and the anode being disposed in this order. Alternatively, the nonaqueous electrolyte secondary battery in accordance with an embodiment of the present invention can be, for example, a nonaqueous secondary battery that achieves an electromotive force through doping and dedoping with lithium, and can be a lithium ion secondary battery that includes a nonaqueous electrolyte secondary battery member including a cathode, a nonaqueous electrolyte secondary battery insulating porous layer in accordance with an embodiment of the present invention, a polyolefin porous film, and an anode which are disposed in this order, that is, a lithium ion secondary battery that includes a nonaqueous electrolyte secondary battery member including a cathode, a nonaqueous electrolyte secondary battery laminated separator in accordance with an embodiment of the present invention, and an anode which are disposed in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is ordinarily configured so that a battery element is enclosed in an exterior member, the battery element including (i) a structure in which the anode and the cathode faces each other via the porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium ion secondary battery. Note that the doping means occlusion, support, adsorption, or insertion, and means a phenomenon in which lithium ions enter an active material of an electrode (e.g., a cathode).

Since the nonaqueous electrolyte secondary battery member in accordance with an embodiment of the present invention includes the nonaqueous electrolyte secondary battery insulating porous layer in accordance with an embodiment of the present invention or includes the nonaqueous electrolyte secondary battery laminated separator in accordance with an embodiment of the present invention, charge resistance of a nonaqueous electrolyte secondary battery is excellent. Since the nonaqueous electrolyte secondary battery in accordance with an embodiment of the present invention includes the nonaqueous electrolyte secondary battery insulating porous layer in accordance with an embodiment of the present invention or includes the nonaqueous electrolyte secondary battery laminated separator in accordance with an embodiment of the present invention, the nonaqueous electrolyte secondary battery has excellent charge resistance.

<Cathode>

A cathode included in the nonaqueous electrolyte secondary battery member in accordance with an embodiment of the present invention or included in the nonaqueous electrolyte secondary battery in accordance with an embodiment of the present invention is not limited to any particular one, provided that the cathode is one that is typically used as a cathode of a nonaqueous electrolyte secondary battery. Examples of the cathode encompass a cathode sheet having a structure in which an active material layer containing a cathode active material and a binding agent is formed on a current collector. The active material layer can further contain an electrically conductive agent.

The cathode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination.

Examples of the binding agent encompass (i) fluorine-based resins such as polyvinylidene fluoride, (ii) acrylic resin, and (iii) styrene butadiene rubber. Note that the binding agent serves also as a thickener.

Examples of the cathode current collector encompass electric conductors such as Al, Ni, and stainless steel. Among these, Al is preferable because Al is easily processed into a thin film and is inexpensive.

Examples of a method of producing the cathode sheet encompass: a method in which a cathode active material, an electrically conductive agent, and a binding agent are pressure-molded on a cathode current collector; and a method in which (i) a cathode active material, an electrically conductive material, and a binding agent are formed into a paste with the use of a suitable organic solvent, (ii) a cathode current collector is coated with the paste, and then (iii) the paste is dried and then pressured so that the paste is firmly fixed to the cathode current collector.

<Anode>

An anode included in the nonaqueous electrolyte secondary battery member in accordance with an embodiment of the present invention or included in the nonaqueous electrolyte secondary battery in accordance with an embodiment of the present invention is not limited to any particular one, provided that the anode is one that is typically used as an anode of a nonaqueous electrolyte secondary battery. Examples of the anode encompass an anode sheet having a structure in which an active material layer containing an anode active material and a binding agent is formed on a current collector. The active material layer can further contain an electrically conductive auxiliary agent.

Examples of the anode active material encompass (i) a material capable of being doped with and dedoped of lithium ions, (ii) lithium metal, and (iii) lithium alloy. Examples of such a material encompass carbonaceous materials such as natural graphite, artificial graphite, cokes, carbon black, and pyrolytic carbon.

The anode current collector is exemplified by Cu, Ni, stainless steel, and the like, among which Cu is more preferable because Cu is not easily alloyed with lithium especially in the case of a lithium ion secondary battery and is easily processed into a thin film.

Examples of a method of producing the anode sheet encompass: a method in which an anode active material is pressure-molded on an anode current collector; and a method in which (i) an anode active material is formed into a paste with the use of a suitable organic solvent, (ii) an anode current collector is coated with the paste, and then (iii) the paste is dried and then pressured so that the paste is firmly fixed to the anode current collector. The paste preferably contains the electrically conductive auxiliary agent and the binding agent.

<Nonaqueous Electrolyte>

A nonaqueous electrolyte in a nonaqueous electrolyte secondary battery in accordance with an embodiment of the present invention is not limited to any particular one, provided that the nonaqueous electrolyte is one that is typically used for a nonaqueous electrolyte secondary battery. The nonaqueous electrolyte can be one prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use (i) only one kind of the above lithium salts or (ii) two or more kinds of the above lithium salts in combination.

Examples of the organic solvent to be contained in the nonaqueous electrolyte encompass carbonates, ethers, esters, nitriles, amides, carbamates, a sulfur-containing compound, and a fluorine-containing organic solvent obtained by introducing a fluorine group into any of these organic solvents. It is possible to use (i) only one kind of the above organic solvents or (ii) two or more kinds of the above organic solvents in combination.

<Nonaqueous Electrolyte Secondary Battery Member Production Method and Nonaqueous Electrolyte Secondary Battery Production Method>

A nonaqueous electrolyte secondary battery member in accordance with an embodiment of the present invention can be produced by, for example, arranging a cathode, a porous layer in accordance with an embodiment of the present invention or a nonaqueous electrolyte secondary battery laminated separator in accordance with an embodiment of the present invention, and an anode in this order.

A nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container under reduced pressure.

EXAMPLES

[Measuring Method]

Physical property values of polyolefin porous films, nonaqueous electrolyte secondary battery insulating porous layers, and nonaqueous electrolyte secondary battery laminated separators in accordance with Examples 1 through 6 and Comparative Example 1 were measured as follows.

<Measurement of Thickness>

In Examples 1 through 6 and Comparative Example 1, thicknesses of the nonaqueous electrolyte secondary battery laminated separators and the polyolefin porous films were measured in conformity with a JIS standard (K 7130-1992) with the use of a high-resolution digital measuring device manufactured by Mitutoyo Corporation.

<Measurement of Weight Per Unit Area>

In each of Examples 1 through 6 and Comparative Example 1, the following was carried out. That is, from the nonaqueous electrolyte secondary battery laminated separator, a square piece of 10 cm×10 cm was cut out as a sample, and a weight $W_1$ (g) of the sample was measured. Then, according to the following Formula (1), a weight per unit area of the nonaqueous electrolyte secondary battery laminated separator (hereinafter also referred to as "entire weight per unit area") was calculated.

Entire weight per unit area(g/m$^2$)=$W_1$(g)/(0.1 m×0.1 m)     (1)

<Calculation of Fractal Dimension>

The nonaqueous electrolyte secondary battery laminated separators produced in Examples 1 through 6 and Comparative Example 1 was impregnated with an epoxy resin, so that a void part of the porous layer was filled with the epoxy resin. Then, the epoxy resin was cured, so that a measurement sample was prepared. After the epoxy resin was cured, Pt—Pd was vapor-deposited on a surface of the sample. With the use of a FIB-SEM (HELIOS600 manufactured by FEI), FIB processing was carried out to the measurement sample in a depth direction (direction toward the inside the measurement sample) from a surface of the measurement sample (i.e. surface on a side on which the porous layer was located), so that a processed surface (cross section) was made.

In so doing, the FIB processing was continued until a porous structure was observed all over a region to be analyzed. That is, a cross section that was a cross section at which the porous structure was observed and which was closest possible to the surface of the measurement sample was regarded as the processed surface.

The processed surface thus obtained was subjected to SEM observation (reflection electron image) at an acceleration voltage of 2.1 kV and with a magnification of 6500 times.

After the SEM observation, FIB processing was carried out to the sample by a thickness of 20 nm in a depth direction of the sample (i.e. direction along the (film) thickness of the porous layer), so that a new processed surface was obtained. Then, the new processed surface thus obtained was subjected to SEM observation (reflection electron image). FIB processing was likewise carried out from the new processed surface by a thickness of 20 nm, so that a further new processed surface was obtained. Then, the further new processed surface was subjected to SEM observation (reflection electron image). By thus repeating FIB processing at thickness intervals of 20 nm and SEM observation of a processed surface, sequential slice images all over the porous layer in the thickness direction were obtained.

Then, positions of the sequential slice images were corrected with the use of image analyzing software (manufactured by Visualization Sciences Group; Avizo ver. 6.0), so that corrected sequential slice images were obtained. Scales are as follows: 19.2 nm/pix in an X-axis and in a Y-axis, and 20 nm/pix in Z-axis.

Specifically, the software was used to subject the sequential slice images to (i) FLATTEN filter processing for making it easy to distinguish fine pores and (ii) median filter processing for removing noises. The image was converted into a two-gradation-level image by Auto-LW so as to distinguish between (i) a resin and a filler part which constitute the porous layer and (ii) a void part (i.e. between, in the measurement sample, (i) a part formed by the resin constituting the porous layer and (ii) a part formed by the epoxy resin). In a case where the resin part exhibited a halftone contrast and was therefore not sufficiently extractable, only a part of the halftone contrast was, by use of an image calculation function, extracted and superimposed on the region distinguished by Auto-LW. These processes were carried out, so that a two-gradation-level image, in which the resin and the filler part were distinguished from the void part, was obtained. The fractal dimension of the void part was calculated with the use of a 3D cancellous bone measurement function of the software. In so doing, LW of Binarize Cortical Bone and of Binarize Trabecular Bone was 128.

Table 1 shows the fractal dimensions thus calculated. Note that analysis regions each had a size of 930 pixels to 960 pixels×480 pixels to 600 pixels×the number of pixels corresponding to the film thickness (120 pixels to 180 pixels). The actual size was 17.9 µm to 18.4 µm×9.2 µm to 11.5 µm×2.4 µm to 3.6 µm.

<Measurement of Charge Resistance>

(Initial Charge and Discharge)

Each of new nonaqueous electrolyte secondary batteries which used the respective nonaqueous electrolyte secondary battery laminated separators produced in Examples 1 through 6 and Comparative Example 1 and which had not been subjected to any charge-discharge cycle was subjected to four cycles of initial charge and discharge at 25° C. Each of the four cycles of the initial charge and discharge was carried out (i) at a voltage ranging from 2.7 V to 4.1 V, (ii) with CC-CV charge at a charge current value of 0.2 C (terminal current condition: 0.02 C) and (iii) with CC discharge at a discharge current value of 0.2 C. Note that 1 C is defined as a value of an electric current at which a rated capacity based on a discharge capacity at 1 hour rate is discharged for 1 hour. The same applies to the following description.

Note that "CC-CV charge" is a charging method in which (i) a battery is charged at a constant electric current set, (ii) after a certain voltage is reached, the certain voltage is maintained while the electric current is being reduced. Note also that "CC discharge is a discharging method in which a battery is discharged at a constant electric current until a certain voltage is reached. The same applies to the following description.

(Measurement of Charge Resistance)

A nonaqueous electrolyte secondary battery, which had been subjected to initial charge and discharge, was then subjected to (i) CC-CV charge at a charge current value of 1 C (terminal current condition: 0.02 C) and then (ii) CC discharge at discharge current values of 0.2 C, 1 C, 5 C, and 10 C in this order. Three cycles of charge and discharge at each of these rates were carried out at 55° C. In so doing, the voltage ranged from 2.7 V to 4.2 V.

Then, a charge resistance was calculated from an IR drop measured 10 seconds after charging at a charge rate of 1 C during the third cycle of discharging at 10 C.

Specifically, the battery resistance was calculated by dividing, by a used electric current value of 20.5 mA (=1 C), a voltage difference (IR drop) obtained by subtracting an initial voltage when the start of charging from a voltage 10 seconds after the charging started. Then, the battery resistance thus calculated was decided as charge resistance $R_1$.

Example 1

<Preparation of Para-Aramid Solution>

PPTA was synthesized with the use of a 5-liter (1) separable flask having a stirring blade, a thermometer, a nitrogen incurrent canal, and a powder addition port.

The separable flask was sufficiently dried, and then 4200 g of NMP was introduced into the separable flask. Then, 272.65 g of calcium chloride, which had been dried at 200° C. for 2 hours, was added, and then a temperature inside the separable flask was increased to 100° C. After the calcium chloride was completely dissolved, the temperature inside the flask was returned to room temperature, and then 132.91 g of paraphenylenediamine (hereinafter abbreviated as "PPD") was added. Then, the PPD was completely dissolved, so that a solution was obtained. While a temperature of the solution was maintained at 20±2° C., 243.32 g of a terephthalic acid dichloride (hereinafter abbreviated as "TPC") was added, to the solution, in ten separate portions at approximately 5-minute intervals. Then, while a temperature of the resultant solution was maintained at 20±2° C., the solution was matured for 1 hour. Then, the solution was stirred under reduced pressure for 30 minutes to eliminate air bubbles, so that a PPTA solution (polymer solution) was obtained.

Part (as a sample) of the polymer solution was reprecipitated with the use of water, and was then extracted as a polymer, so that PPTA was obtained. Then, intrinsic viscosity of the PPTA thus obtained was measured, and was 1.97 dl/g. The PPTA solution thus obtained will be referred to as "solution A1", and the PPTA thus obtained will be referred to as "polymer A1".

<Synthesis of Aromatic Polyester>

Into a reactor including a stirring apparatus, a torque meter, a nitrogen gas inlet tube, a thermometer, and a reflux condenser, 248.6 g (1.8 mol) of 4-hydroxybenzoic acid, 468.6 g (3.1 mol) of 4-hydroxyacetanilide, 681.1 g (4.1 mol) of isophthalic acid, 110.1 g (1.0 mol) of hydrochinone, and 806.5 g (7.90 mol) of acetic anhydride were introduced. Then, a gas inside the reactor was sufficiently replaced with a nitrogen gas, and then a temperature inside the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 300 minutes. At a time point at which an increase in torque was observed, it was determined that a reaction had ended. Then, a resultant content was extracted. The resultant content was cooled to room temperature, and then was crushed with the use of a crusher. Then, an aromatic polyester powder having a relatively low molecular weight was obtained. Then, a temperature, at which the aromatic polyester powder started flowing, was measured with the use of a flow tester "Model CFT-500" manufactured by Shimadzu Corporation, and was 253.2° C. Furthermore, the aromatic polyester powder was subjected to solid phase polymerization by being subjected to a heat treatment at 290° C. in a nitrogen atmosphere for 3 hours.

100 g of the obtained liquid crystalline polyester was added to 400 g of N-methyl-2-pyrrolidone, and then a resultant mixture was heated at 100° C. for 2 hours, so that a liquid composition was obtained. Then, viscosity of the liquid composition was measured at a temperature of 23° C. with the use of a B-type viscometer "Model TVL-20" (Rotor No. 22, rotation speed: 20 rpm) manufactured by Toki Sangyo Co. Ltd., and was 3000 cP. The wholly aromatic polyester solution thus obtained will be referred to as "solution B1", and the wholly aromatic polyester thus obtained will be referred to as "polymer B1".

<Preparation of Coating Solution>

The solution A1 and the solution B1 were mixed to form a mixed solution so that a mixing ratio, (polymer A1): (polymer B1), would be 100 parts by weight: 100 parts by weight. Then, 400 parts by weight of an alumina powder having an average particle size of 0.02 μm and 400 parts by weight of an alumina powder having an average particle size of 0.3 μm were added to the mixed solution. Then, a resultant mixture was diluted with NMP so that a solid content concentration would be 9%. Then, the resultant mixture was stirred with the use of a homogenizer, and was then treated twice at 50 MPa with the use of a pressure type dispersing device, so that a coating solution 1 was obtained.

<Production of Nonaqueous Electrolyte Secondary Battery Laminated Separator>

A separator base material (air permeability: 120 seconds/ 100 cc, thickness: 15 μm) made of polyethylene was attached to a glass plate. Then, with the use of a bar coater manufactured by Tester Sangyo Co., Ltd., a surface (one surface) of the separator base material was coated with the coating solution 1 at a temperature of 23° C. and a relative humidity of 50%. Then, the resultant coated product was placed, for 1 minute, in a humidifying oven having a relative humidity of 50% at 50° C., was washed with the use of ion exchange water, and was then dried with the use of an oven at 80° C., so that a nonaqueous electrolyte secondary battery laminated separator 1 was obtained. A thickness and an entire weight per unit area of the nonaqueous electrolyte secondary battery laminated separator 1 were 16 μm and 9.2 g/m², respectively.

<Production of Nonaqueous Electrolyte Secondary Battery>

Next, with the use of the nonaqueous electrolyte secondary battery laminated separator 1 produced as described above, a nonaqueous electrolyte secondary battery was produced as follows.

(Preparation of Cathode)

A commercially available cathode which was produced by applying $LiNi_{0.5}Mn_{0.3}Co_{0.2}O_2$/conductive material/PVDF (weight ratio 92/5/3) to an aluminum foil was used. The aluminum foil of the commercially available cathode was cut so that a portion of the cathode where a cathode active material layer was formed had a size of 45 mm×30 mm and a portion where the cathode active material layer was not formed, with a width of 13 mm, remained around that portion. The cathode active material layer had a thickness of 58 µm and density of 2.50 g/cm$^3$. The cathode had a capacity of 174 mAh/g.

(Preparation of Anode)

A commercially available anode produced by applying graphite/styrene-1,3-butadiene copolymer/carboxymethyl cellulose sodium (weight ratio 98/1/1) to a copper foil was used. The copper foil of the commercially available anode was cut so that a portion of the anode where an anode active material layer was formed had a size of 50 mm×35 mm, and a portion where the anode active material layer was not formed, with a width of 13 mm, remained around that portion. The anode active material layer had a thickness of 49 µm and density of 1.40 g/cm$^3$. The anode had a capacity of 372 mAh/g.

(Assembling of Nonaqueous Electrolyte Secondary Battery)

With the use of the cathode, the anode, and the nonaqueous electrolyte secondary battery laminated separator 1, a nonaqueous electrolyte secondary battery was produced by the following method.

In a laminate pouch, the cathode, the nonaqueous electrolyte secondary battery laminated separator 1, and the anode were disposed (provided) in this order so as to obtain a nonaqueous electrolyte secondary battery member. In this case, the cathode and the anode were positioned so that a whole of a main surface of the cathode active material layer of the cathode was included in a range of a main surface (overlapped the main surface) of the anode active material layer of the anode.

Subsequently, the nonaqueous electrolyte secondary battery member was put in a bag made by disposing an aluminum layer and a heat seal layer, and 0.25 mL of a nonaqueous electrolyte solution was poured into the bag.

The nonaqueous electrolyte solution was an electrolyte solution at 25° C. obtained by dissolving LiPF$_6$ with a concentration of 1.0 mole per liter in a mixed solvent of ethyl methyl carbonate, diethyl carbonate, and ethylene carbonate in a volume ratio of 50:20:30. The bag was heat-sealed while a pressure inside the bag was reduced, so that a nonaqueous electrolyte secondary battery was produced. The nonaqueous electrolyte secondary battery had a design capacity of 20.5 mAh. The nonaqueous electrolyte secondary battery thus produced will be referred to as a nonaqueous electrolyte secondary battery 1.

Example 2

<Production of Nonaqueous Electrolyte Secondary Battery Laminated Separator>

A nonaqueous electrolyte secondary battery laminated separator 2 was obtained by a method similar to the method described in Example 1 except that (i) the solution A1 and the solution B$_1$ were mixed so that the ratio, (polymer A$_1$):(polymer B$_1$), as described in Example 1 was changed to 124 parts by weight: 76 parts by weight in preparing a coating solution and (ii) a resultant mixture was diluted with NMP so that a solid content concentration after addition of an alumina powder would be 8%. A thickness and an entire weight per unit area of the nonaqueous electrolyte secondary battery laminated separator 2 were 15.9 µm and 9.2 g/m$^2$, respectively.

<Production of Nonaqueous Electrolyte Secondary Battery>

A nonaqueous electrolyte secondary battery was produced by a method similar to the method described in Example 1 except that the nonaqueous electrolyte secondary battery laminated separator 2 was used instead of the nonaqueous electrolyte secondary battery laminated separator 1. The nonaqueous electrolyte secondary battery will be referred to as a nonaqueous electrolyte secondary battery 2.

Example 3

<Synthesis of Thermoplastic Resin>
<Preparation of Aromatic Polyester Solution B2>

Into a reactor including a stirring apparatus, a torque meter, a nitrogen gas inlet tube, a thermometer, and a reflux condenser, 941 g (5.0 mol) of 2-hydroxy-6-naphthoic acid, 377.9 g (2.5 mol) of 4-hydroxyacetanilide, 415.3 g (2.5 mol) of isophthalic acid, and 867.8 g (8.5 mol) of acetic anhydride were introduced. Then, a gas inside the reactor was sufficiently replaced with a nitrogen gas, and then a temperature inside the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 170 minutes. At a time point at which an increase in torque was observed, it was determined that a reaction had ended. Then, a resultant content was extracted. The resultant content was cooled to room temperature, and then was crushed with the use of a crusher. Then, a wholly aromatic polyester powder having a relatively low molecular weight was obtained.

A temperature, at which the wholly aromatic polyester powder having a relatively low molecular weight started flowing, was measured with the use of a flow tester "Model CFT-500" manufactured by Shimadzu Corporation, and was 197° C.

Then, the wholly aromatic polyester powder was subjected to solid phase polymerization by being subjected to a heat treatment at 180° C. in a nitrogen atmosphere for 5 hours, and then being subjected to a heat treatment at 250° C. in a nitrogen atmosphere for 5 hours. A temperature, at which the wholly aromatic polyester having a relatively high molecular weight after the solid phase polymerization started flowing, was measured as described above, and was 302° C.

40 g of the obtained wholly aromatic polyester having a relatively high molecular weight was added to 460 g of N-methyl-2-pyrrolidone, and then a resultant mixture was heated at 100° C. for 2 hours, so that a liquid composition was obtained. Then, viscosity of the liquid composition was measured at a temperature of 23° C. with the use of a B-type viscometer "Model TVL-20" (Rotor No. 21, rotation speed: 5 rpm) manufactured by Toki Sangyo Co. Ltd., and was 800 cP. The wholly aromatic polyester solution thus obtained will be referred to as "solution B2", and the wholly aromatic polyester thus obtained will be referred to as "polymer B2".

<Preparation of Coating Solution and Production of Nonaqueous Electrolyte Secondary Battery Laminated Separator>

A nonaqueous electrolyte secondary battery laminated separator 3 was obtained by a method similar to the method described in Example 1 except that the solution A1 and the solution B2 were mixed at a mixture ratio, (polymer A1):(polymer B2) was 100 parts by weight: 100 parts by weight.

A thickness and an entire weight per unit area of the nonaqueous electrolyte secondary battery laminated separator 3 were 16.6 µm and 9.6 g/m², respectively.

<Production of Nonaqueous Electrolyte Secondary Battery>

A nonaqueous electrolyte secondary battery was produced by a method similar to the method described in Example 1 except that the nonaqueous electrolyte secondary battery laminated separator 3 was used instead of the nonaqueous electrolyte secondary battery laminated separator 1. The nonaqueous electrolyte secondary battery will be referred to as a nonaqueous electrolyte secondary battery 3.

Example 4

<Preparation of Coating Solution and Production of Nonaqueous Electrolyte Secondary Battery Laminated Separator>

A nonaqueous electrolyte secondary battery laminated separator 4 was obtained by a method similar to the method described in Example 1 except that (i) the solution A1 and the solution B1 were mixed so that the ratio, (polymer A1):(polymer B1), was changed to 150 parts by weight: 50 parts by weight in preparing a coating solution and (ii) a resultant mixture was diluted with NMP so that a solid content concentration after addition of an alumina powder would be 7%. A thickness and an entire weight per unit area of the nonaqueous electrolyte secondary battery laminated separator 4 were 15.8 µm and 9.1 g/m², respectively.

<Production of Nonaqueous Electrolyte Secondary Battery>

A nonaqueous electrolyte secondary battery was produced by a method similar to the method described in Example 1 except that the nonaqueous electrolyte secondary battery laminated separator 4 was used instead of the nonaqueous electrolyte secondary battery laminated separator 1. The nonaqueous electrolyte secondary battery will be referred to as a nonaqueous electrolyte secondary battery 4.

Example 5

<Preparation of Coating Solution>

A coating solution 5 was obtained by a method similar to the method described in Example 1 except that (i) the solution A1, an 400 parts by weight of alumina powder having an average particle size of 0.02 µm, and 400 parts by weight of alumina powder having an average particle size of 0.3 µm were mixed so that the polymer A1 would account for 200 parts by weight and (ii) a resultant mixture was diluted with NMP so that a solid content concentration would be 6%.

<Production of Nonaqueous Electrolyte Secondary Battery Laminated Separator>

A nonaqueous electrolyte secondary battery laminated separator 5 was obtained by a method similar to the method described in Example 1 with the use of the coating solution 5. A thickness and an entire weight per unit area of the nonaqueous electrolyte secondary battery laminated separator 5 were 16.5 µm and 9.6 g/m², respectively.

<Production of Nonaqueous Electrolyte Secondary Battery>

A nonaqueous electrolyte secondary battery was produced by a method similar to the method described in Example 1 except that the nonaqueous electrolyte secondary battery laminated separator 5 was used instead of the nonaqueous electrolyte secondary battery laminated separator 1. The nonaqueous electrolyte secondary battery will be referred to as a nonaqueous electrolyte secondary battery 5.

Example 6

<Synthesis of Aromatic Polyester>

Into a reactor including a stirring apparatus, a torque meter, a nitrogen gas inlet tube, a thermometer, and a reflux condenser, 1016 g (5.4 mol) of 2-hydroxy-6-naphthoic acid, 1860 g (12.3 mol) of 4-hydroxyacetanilide, 2044 g (12.3 mol) of isophthalic acid, and 2374 g (23.25 mol) of acetic anhydride were introduced. Then, a gas inside the reactor was sufficiently replaced with a nitrogen gas, and then a temperature in the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 170 minutes. At a time point at which an increase in torque was observed, it was determined that a reaction had ended. Then, a resultant content was extracted. The resultant content was cooled to room temperature, and then was crushed with the use of a crusher. Then, a liquid crystalline polyester powder having a relatively low molecular weight was obtained. Then, a temperature, at which the liquid crystalline polyester powder started flowing, was measured with the use of a flow tester "Model CFT-500" manufactured by Shimadzu Corporation, and was 235° C. Furthermore, the liquid crystalline polyester powder was subjected to solid phase polymerization by being subjected to a heat treatment at 223° C. in a nitrogen atmosphere for 3 hours. A temperature, at which the liquid crystalline polyester started flowing after the solid phase polymerization, was 270° C. A wholly aromatic polyester solution thus obtained will be referred to as a solution B3, and the wholly aromatic polyester thus obtained will be referred to as a polymer B3.

<Preparation of Coating Solution>

The solution A1 and the solution B3 were mixed to form a mixed solution so that a mixing ratio, (polymer A1):(polymer B3), would be 100 parts by weight: 100 parts by weight. Then, 400 parts by weight of an alumina powder having an average particle size of 0.02 µm and 400 parts by weight of an alumina powder having an average particle size of 0.3 µm were added to the mixed solution. Then, a resultant mixture was diluted with NMP so that a solid content concentration would be 6.0%. Then, the resultant mixture was stirred with the use of a homogenizer, and was then treated twice at 50 MPa with the use of a pressure type dispersing device, so that a coating solution 6 was obtained.

<Production of Nonaqueous Electrolyte Secondary Battery Laminated Separator>

A nonaqueous electrolyte secondary battery laminated separator 6 was obtained by a method similar to the method described in Example 1 except that the coating solution 6 was used instead of the coating solution 1.

<Production of Nonaqueous Electrolyte Secondary Battery>

A nonaqueous electrolyte secondary battery was produced by a method similar to the method described in Example 1 except that the nonaqueous electrolyte secondary battery laminated separator 6 was used instead of the nonaqueous electrolyte secondary battery laminated separator 1. The nonaqueous electrolyte secondary battery will be referred to as a nonaqueous electrolyte secondary battery 6.

Comparative Example 1

<Preparation of Coating Solution>

A coating solution 7 was obtained by (i) mixing the solution A1, 400 parts by weight of alumina powder having an average particle size of 0.02 µm, and 400 parts by weight of alumina powder having an average particle size of 0.3 µm so that the polymer A1 would account for 200 parts by weight, (ii) diluting the resultant mixture with NMP so that a solid content concentration would be 9%, (iii) stirring the resultant mixture with the use of a homogenizer, and (iv) treating the resultant mixture twice at 50 MPa with the use of a pressure type dispersing device.

<Production of Nonaqueous Electrolyte Secondary Battery Laminated Separator>

A nonaqueous electrolyte secondary battery laminated separator 7 was obtained by a method similar to the method described in Example 1 except that (i) the coating solution 7 was used and (ii) conditions for humidifying the coated product were changed so that the coated product was placed, for 1 minute, in a humidifying oven having a relative humidity of 80% at 60° C. A thickness and an entire weight per unit area of the nonaqueous electrolyte secondary battery laminated separator 7 were 17.1 µm and 9.7 g/m$^2$, respectively.

<Production of Nonaqueous Electrolyte Secondary Battery>

A nonaqueous electrolyte secondary battery was produced by a method similar to the method described in Example 1 except that the nonaqueous electrolyte secondary battery laminated separator 7 was used instead of the nonaqueous electrolyte secondary battery laminated separator 1. The nonaqueous electrolyte secondary battery will be referred to as a nonaqueous electrolyte secondary battery 7.

CONCLUSION

The following Table 1 shows the respective physical property values of the nonaqueous electrolyte secondary battery laminated separators 1 through 7 produced in Examples 1 through 6 and Comparative Example 1. Table 1 also shows respective charge resistances of the nonaqueous electrolyte secondary batteries 1 through 7 produced in Examples 1 through 6 and Comparative Example 1.

TABLE 1

|  | Fractal Dimension [—] | Charge Resistance [Ω] |
| --- | --- | --- |
| Example 1 | 2.45 | 1.408 |
| Example 2 | 2.47 | 1.588 |
| Example 3 | 2.47 | 1.626 |
| Example 4 | 2.49 | 1.428 |
| Example 5 | 2.50 | 1.510 |
| Example 6 | 2.59 | 1.719 |
| Comparative Example 1 | 2.41 | 1.766 |

Table 1 reveals that the nonaqueous electrolyte secondary batteries including the respective nonaqueous electrolyte secondary battery insulating porous layers which were produced in Examples 1 through 6 and which had respective fractal dimensions of 2.42 to 2.60 each had a charge resistance lower than that of the nonaqueous electrolyte secondary battery including the nonaqueous electrolyte secondary battery insulating porous layer which was produced in Comparative Example 1 and which had a fractal dimension of less than 2.42.

In view of the above, it was revealed that the nonaqueous electrolyte secondary batteries, which included the nonaqueous electrolyte secondary battery insulating porous layers produced in respective Examples 1 through 6, each had (i) a reduced charge resistance and (ii) an increased charging characteristic.

INDUSTRIAL APPLICABILITY

A nonaqueous electrolyte secondary battery insulating porous layer in accordance with an embodiment of the present invention allows a nonaqueous electrolyte secondary battery, in which the nonaqueous electrolyte secondary battery insulating porous layer is included, to have (i) a reduced charge resistance and (ii) an increased charging characteristic. Therefore, the nonaqueous electrolyte secondary battery insulating porous layer in accordance with an embodiment of the present invention is useful as a member of a nonaqueous electrolyte secondary battery.

The invention claimed is:

1. A laminated separator for a nonaqueous electrolyte secondary battery comprising:
    a polyolefin porous film; and
    an insulating porous layer comprising a thermoplastic resin,
    the insulating porous layer having a fractal dimension of 2.42 to 2.60, the fractal dimension being calculated from a three-dimensional image showing a void part and a solid content part on respective two gradation levels, wherein the three-dimensional image is prepared by analyzing images of cross sections obtained by making observation at intervals of 20 nm in a thickness direction from a surface of the insulating porous layer using a FIB-SEM having a magnification of 6500 times,
    the thermoplastic resin comprising: (i) an aromatic polymer selected from the group consisting of aromatic polyester, aromatic polycarbonate, and aromatic polyether, and (ii) a heat-resistant resin selected from the group consisting of aromatic polyamide, aromatic polyimide, and polybenzimidazole.

2. The laminated separator for a nonaqueous electrolyte secondary battery recited in claim 1, wherein the aromatic polyamide is an aramid resin.

3. A nonaqueous electrolyte secondary battery comprising:
    the laminated separator recited in claim 1.

4. A nonaqueous electrolyte secondary battery comprising:
    a cathode;
    the laminated separator recited in claim 1; and
    an anode,
    the cathode, the laminated separator, and the anode being arranged in this order.

* * * * *